Sept. 29, 1959 W. P. VAFAKOS 2,906,455

RECIPROCAL MECHANISM (INVERSOR)

Filed June 6, 1956

INVENTOR.
WILLIAM P. VAFAKOS
BY Victor De Bost
ATTORNEY

United States Patent Office 2,906,455

Patented Sept. 29, 1959

2,906,455

RECIPROCAL MECHANISM (INVERSOR)

William P. Vafakos, Brooklyn, N.Y., assignor to Sperry Rand Corporation, Ford Instrument Company Division, Long Island City, N.Y., a corporation of Delaware Application June 6, 1956, Serial No. 589,603

10 Claims. (Cl. 235—61)

The present invention relates in general to computing devices and more particularly to computing devices for computing reciprocal functions of numbers.

In devices for computing reciprocal functions of numbers, it has been the practice to use either reciprocal cams or reciprocal linkages sometimes referred to as inversors. Whenever such computing devices have had to take care of large ratios of the maximum input to the minimum input, such as ratios over 15 to 1, the components in the computing devices have had to become extremely large. Since desirable features for computing devices are compactness, lightness, simplicity, strength and ease of maintenance, the computing devices heretofore used have had to be limited to small ratios, under 15 to 1, of the maximum input to the minimum input.

It is, therefore, an object of the invention to provide improved means to compute the reciprocal functions of numbers.

Another object of the invention is to provide practical means for computing the reciprocal functions for numbers whose ratio of the maximum input to the minimum input will be over 15 to 1 and up to the neighborhood of 1000 to 1.

A still further object of the invention is to make possible the use of small, compact, light and easily maintained equipment.

To these ends the invention contemplates the use of a double integrating means combined with a summing means to eliminate the necessity of having to use reciprocal cams or reciprocal linkages in order to compute the reciprocal functions of numbers. Therefore, where large ratios such as 1000 to 1 of the maximum input to the minimum input are necessary, the invention allows the use of small, compact, light and easily maintained equipment.

Figure 1:
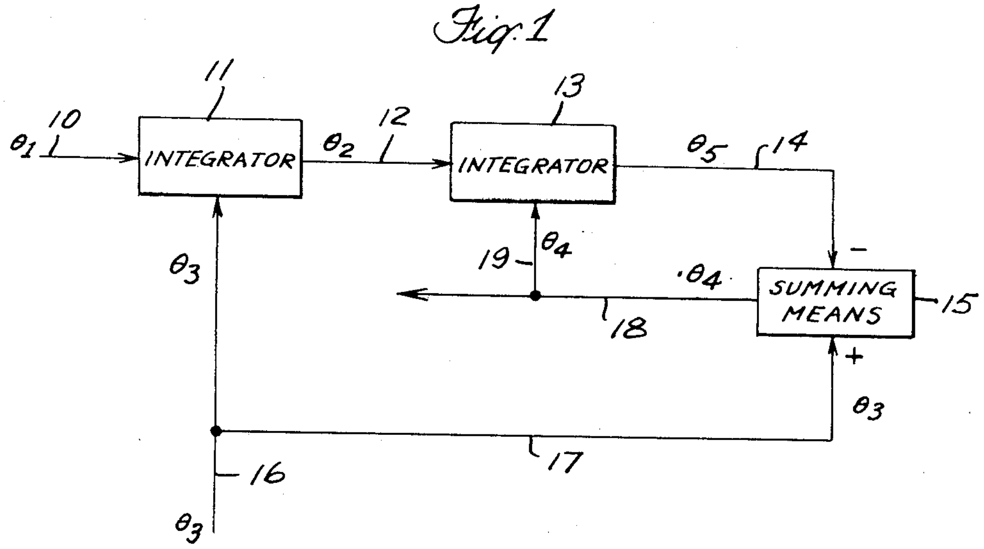
Figure 2:
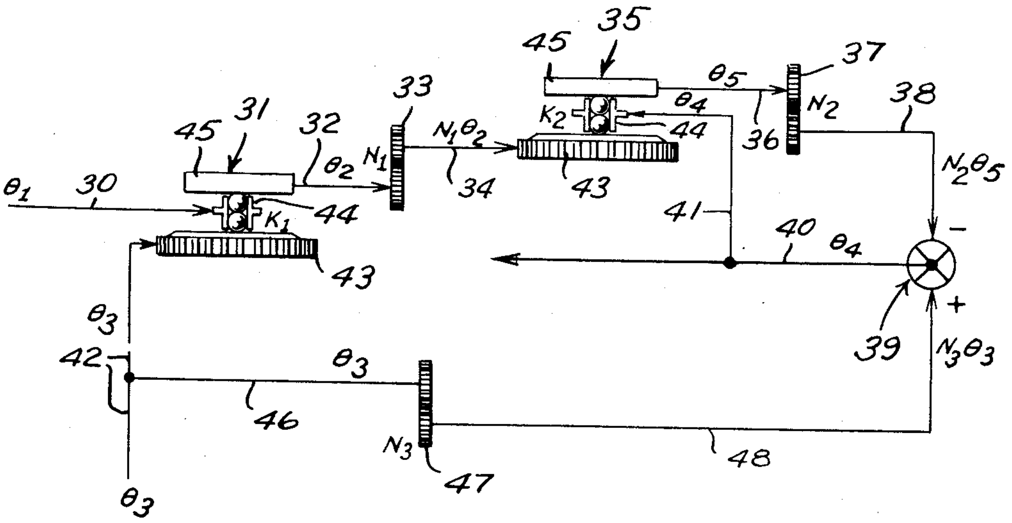

The invention has other objects and advantages which will appear from the following description of a particular embodiment of the invention in conjunction with the accompanying drawing, in which:

Fig. 1 shows a simplified block-type diagram of a system for computing reciprocal functions of numbers; and Fig. 2 shows a particular embodiment of the invention, a mechanical mechanization of a system for computing reciprocal functions of numbers.

With reference to the drawing of Fig. 1, the general embodiment shown there of the invention comprises, in general, an integrator 11, an integrator 13, and a summing means 15, all connected together such that output $\theta_4$ from summing means 15 will be inversely proportional to input $\theta_1$ which is the input to integrator 11.

An input $\theta_1$ is fed into integrator 11 by transmitting means 10, and is set and held constant. Another input $\theta_3$ is also fed into integrator 11 by transmitting means 16, and is such that its derivative ${}_3$ is any constant except zero. Output $\theta_2$ of integrator 11 is the integral of $\theta_1$ with respect to $\theta_3$ multiplied by a proportionality constant $K_1$ of integrator 11 such that the equation of integrator 11 is $\dot{\theta}_2=K_1\theta_1\dot{\theta}_3$.

Output $\theta_2$ of integrator 11 is then fed into integrator 13 by transmitting means 12. Output $\theta_4$ of summing means 15 is also fed into integrator 13 by transmitting means 18 and 19. Therefore, output $\theta_5$ of integrator 13 becomes the integral of $\theta_4$ with respect to $\theta_2$ multiplied by a proportionality constant $K_2$ of integrator 13 such that the equation of integrator 13 is $\dot{\theta}_5=K_2\theta_4\dot{\theta}_2$.

Output $\theta_5$ of integrator 13 is then fed into summing means 15 by transmitting means 14. Input $\theta_3$ is also fed into summing means 15 by transmitting means 17 and summing means 15 subtracts input $\theta_5$ from input $\theta_3$ so that output $\theta_4$ from summing means 15 is the difference between the inputs $\theta_3$ and $\theta_5$.

By going through the following derivation it is clearly shown that $\theta_4$ is $$\propto\frac{1}{\theta_1}$$

$\dot{\theta}_2=K_1\theta_1\dot{\theta}_3$ (1) Equation of integrator 11

$\dot{\theta}_5=K_2\theta_4\dot{\theta}_2$ (2) Equation of integrator 13

$\theta_4=\theta_3-\theta_5$ (3) Equation of summing means 15

By eliminating $\theta_2$ and $\theta_5$ from Equations 1, 2 and 3 we obtain:

$$\dot{\theta}_4+K_1K_2\theta_1\dot{\theta}_3\theta_4=\dot{\theta}_3 \quad (4)$$

In general $\theta_1$ and $\theta_3$ are input functions of time. However, if we consider a situation where $\theta_1$ is set and held constant the complete solution of differential Equation 4 becomes:

$$\theta_4=\frac{1}{K_1K_2\theta_1}+Ce^{-K_1K_2\theta_1\dot{\theta}_3t} \quad (5)$$

where C is a constant of integration which may be determined by initial conditions. In the steady state, however, if $\theta_3$ is any increasing function of time, $Ce^{-K_1K_2\theta_1\dot{\theta}_3}$ approaches zero, and the Equation 5 resolves itself into:

$$\theta_4=\frac{1}{K_1K_2\theta_1} \quad (6)$$

Since $K_1$ and $K_2$ are proportionality constants of the integrators 11 and 13, Equation 6 merely states that output $\theta_4$ of summing means 15 is inversely proportional to input $$\theta_1, \theta_4\propto\frac{1}{\theta_1}$$

With reference to the drawing of Figure 2, the particular embodiment shown there of the invention comprises, in general, a mechanical integrator 31, a mechanical integrator 35, and a differential 39, all connected through different gearing ratios such that the output $\theta_4$ from differential 39 will be inversely proportional to input $\theta_1$ which is the input to mechanical integrator 31.

The mechanical integrators 31 and 35 are of the well known disc type, which consists of a disc 43, a roller 45, and two balls in a carriage 44, such that the output from roller 45 will be the integral of the input to carriage 44 with respect to the input to disc 43 multiplied by a proportionality constant of the integrators 31 and 35.

Therefore, by feeding an input $\theta_1$ into carriage 44 of integrator 31 by transmitting means 30, and by feeding another input $\theta_3$ into disc 43 of integrator 31 by transmitting means 42, the output $\theta_2$ from roller 45 of integrator 31 will be the integral of $\theta_1$ with respect to $\theta_3$ multiplied by a proportionality constant $K_1$ of integrator 31 such that the equation of integrator 31 is $\dot{\theta}_2=K_1\theta_1\dot{\theta}_3$.

Output $\theta_2$ of integrator 31 is then fed into disc 43 of integrator 35 by transmitting means 32, 33 and 34. By passing $\theta_2$ through transmitting means 33 whose gearing ratio is $N_1$, the input to disc 43 of integrator 35 becomes $N_1\dot{\theta}_2$. Output $\theta_4$ from the spider of differential 39 is fed into carriage 44 of integrator 35 by transmitting means 40 and 41. Therefore, output $\theta_5$ from roller 45 of integrator 35 becomes the integral of $\theta_4$ with respect to $N_1\theta_2$ multiplied by a proportionality constant $K_2$ of integrator 35 such that the equation of integrator 35 is $\dot{\theta}_5=K_2N_1\theta_4\dot{\theta}_2$.

Output $\theta_5$ of integrator 35 is then fed into differential 39 by transmitting means 36, 37 and 38. By passing $\theta_5$ through transmitting means 37 whose gearing ratio is $N_2$, the input $\theta_5$ to differential 39 becomes $N_2\theta_5$. Input $\theta_3$ is also fed into differential 39 by transmitting means 46, 47 and 48. By passing $\theta_3$ through transmitting means 47 whose gearing ratio is $N_3$, the input $\theta_3$ to differential 39 becomes $N_3\theta_3$. Differential 39 subtracts input $N_2\theta_5$ from input $N_3\theta_3$ so that output $\theta_4$ from differential 39 is the difference between the inputs $N_3\theta_3$ and $N_2\theta_5$.

By going through the following derivation it is clearly shown that $$\theta_4 \text{ is } \propto \frac{1}{\theta_1}$$

$$\dot{\theta}_2=K_1\theta_1\dot{\theta}_3 \quad (7) \text{ Equation of integrator 31}$$

$$\dot{\theta}_5=K_2N_1\theta_4\dot{\theta}_2 \quad (8) \text{ Equation of integrator 35}$$

$$\theta_4=N_3\theta_3-N_2\theta_5 \quad (9) \text{ Equation of differential 39}$$

By eliminating $\theta_2$ and $\theta_5$ from Equations 7, 8 and 9 we obtain:

$$\dot{\theta}_4+K_1K_2N_1N_2\theta_1\dot{\theta}_3\theta_4=N_3\dot{\theta}_3 \quad (10)$$

In general $\theta_1$ and $\theta_3$ are input functions of time. However, if we consider a situation where $\theta_1$ is set and held constant the complete solution of the differential Equation 10 in the steady state condition resolves itself into:

$$\theta_4=\frac{N_3}{K_1K_2N_1N_2\theta_1} \quad (11)$$

Since $K_1$ and $K_2$ are proportionality constants of the integrators 31 and 35, and $N_1N_2$ and $N_3$ are the gearing ratios of 33, 37 and 47, respectively, Equation 11 merely states that output $\theta_4$ of differential 39 is inversely proportional to input $$\theta_1,\ \theta_4 \propto \frac{1}{\theta_1}$$

The flexibility in design from the use of the gearing ratios $N_1N_2$ and $N_3$ can best be illustrated by the use of the following example:

Supposing we are limited by the integrators to $\theta_1$ max.$=R_1$ and $\theta_4$ max.$=R_2$ and we desire inputs of $\theta_1$ and outputs of $\theta_4$ over a ratio such that:

$$R_M=\frac{\theta_1 \text{ max.}}{\theta_1 \text{ min.}}=\frac{\theta_4 \text{ max.}}{\theta_4 \text{ min.}} \quad (12)$$

then by substituting $\theta_1$ max.$=R_1$ and $\theta_4$ max.$=R_2$ into Equation 12 we get:

$$\theta_1 \text{ min.}=\frac{R_1}{R_M} \text{ and } \theta_4 \text{ min.}=\frac{R_2}{R_M} \quad (13)$$

Referring back to Equation 11 it is clearly seen that:

$$\begin{aligned}&\text{when } \theta_1=\theta_1 \text{ min. then } \theta_4=\theta_4 \text{ max.}\\&\text{when } \theta_1=\theta_1 \text{ max. then } \theta_4=\theta_4 \text{ min.}\end{aligned} \quad (14)$$

and using either the minimum or maximum limits in Equation 11 we obtain:

$$\frac{N_1N_2}{N_3}=\frac{R_M}{R_1R_2K_1K_2} \quad (15)$$

In any practical solution we would know $R_M$. We therefore choose our integrators which would fix the values of $R_1$, $R_2$, $K_1$ and $K_2$, such that an accurate output is obtained for:

$$\theta_4=\frac{R_2}{R_M} \text{ and } \theta_1=\frac{R_1}{R_M}$$

We next choose $N_1$, $N_2$ and $N_3$ that would satisfy Equation 15. Using this procedure we obtain by substituting Equation 15 in Equation 11 that:

$$\theta_4=\frac{R_1R_2}{R_M\theta_1} \text{ over range } \frac{\theta_1 \text{ max.}}{\theta_1 \text{ min.}}=\frac{\theta_4 \text{ max.}}{\theta_4 \text{ min.}}=R_M$$

with $\theta_1$ max.$=R_1$ and $\theta_4$ max.$=R_2$ which is within the range of the integrators.

Although a particular embodiment of the invention has been described and illustrated it is understood that the present disclosure has been made by way of example and that changes in the details of construction and the combination and arrangement of parts may be made without departing from the spirit and the scope of the invention as hereinafter claimed.

What is claimed is:

1. A computing mechanism comprising a first mechanical integrator of the ball-disk type having a rotatable input disk and an output cylinder which is driven by said disk through a pair of interposed contacting balls, means to feed an input having a constant value into said first integrator to position said balls with respect to said disk, means to feed a second input which is any increasing function of time into said integrator for rotating said disk, a second mechanical integrator of the ball-disk type having a rotatable input disk and an output cylinder which is driven by said disk through a pair of interposed contacting balls, a summing means, means by which the output of said first integrator is imparted to said second integrator for driving the said disk thereof, means by which the output of said second integrator is imparted to said summing means, transfer means by which said second input is also imparted to said summing means, and means by which the output of said summing means is imparted to said second integrator to vary the position of the said balls thereof with respect to the said disk thereof.

2. A computing mechanism as defined in claim 1 in which said summing means comprises a mechanical differential.

3. A computing mechanism as defined in claim 2 in which the means by which the output of said first integrator is imparted to said second integrator includes ratio modifying gearing.

4. A computing mechanism as defined in claim 2 in which the means by which the output of said second integrator is imparted to said summing means includes ratio modifying gearing.

5. A computing mechanism as defined in claim 2 in which the means by which the second input is also imparted to said summing means includes ratio modifying gearing.

6. A computing mechanism as defined in claim 2 in which the means by which the output of said first integrator is imparted to said second integrator, the means by which the output of said second integrator is imparted to said summing means, and the means by which the second input is imparted to said summing means each includes ratio modifying gearing.

7. A computing mechanism as defined in claim 1 in which the means by which the output of said first integrator is imparted to said second integrator includes ratio modifying gearing.

8. A computing mechanism as defined in claim 1 in which the means by which the output of said second integrator is imparted to said summing means includes ratio modifying gearing.

9. A computing mechanism as defined in claim 1 in which the means by which the second input is also imparted to said summing means includes ratio modifying gearing.

10. A computing mechanism as defined in claim 1 in which the means by which the output of said first integrator is imparted to said second integrator, the means by which the output of said second integrator is imparted to said summing means, and the means by which the second input is imparted to said summing means each includes ratio modifying gearing.

References Cited in the file of this patent

Bell Laboratories Record (Lakatos), March 1951, page 111.

Product Engineering (Wall), September 1953, pages 134 and 140.

Analog Methods in Computation and Simulation (Soroka), 1954, pages 5–9, 29 and 30.